July 14, 1964 E. D. INGOLD 3,140,629
GLASS CUTTING APPARATUS
Filed Feb. 21, 1961 6 Sheets-Sheet 1

INVENTOR.
EDWARD D. INGOLD
BY
Oscar L. Spencer
ATTORNEY

July 14, 1964  E. D. INGOLD  3,140,629
GLASS CUTTING APPARATUS
Filed Feb. 21, 1961  6 Sheets-Sheet 2
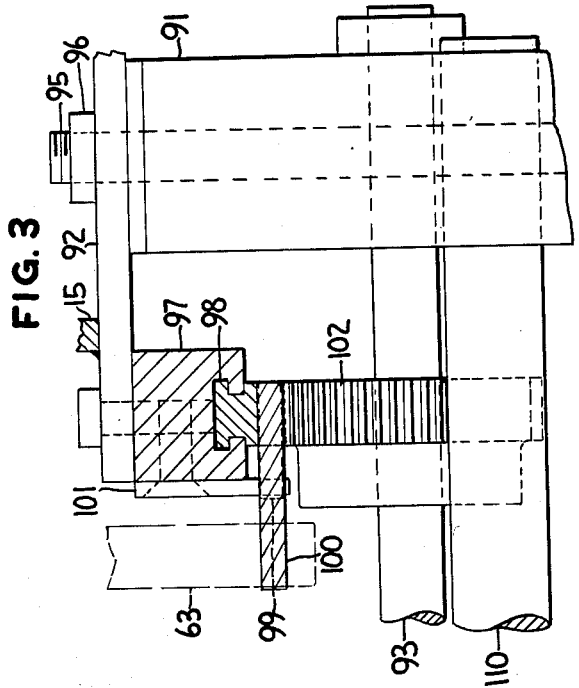
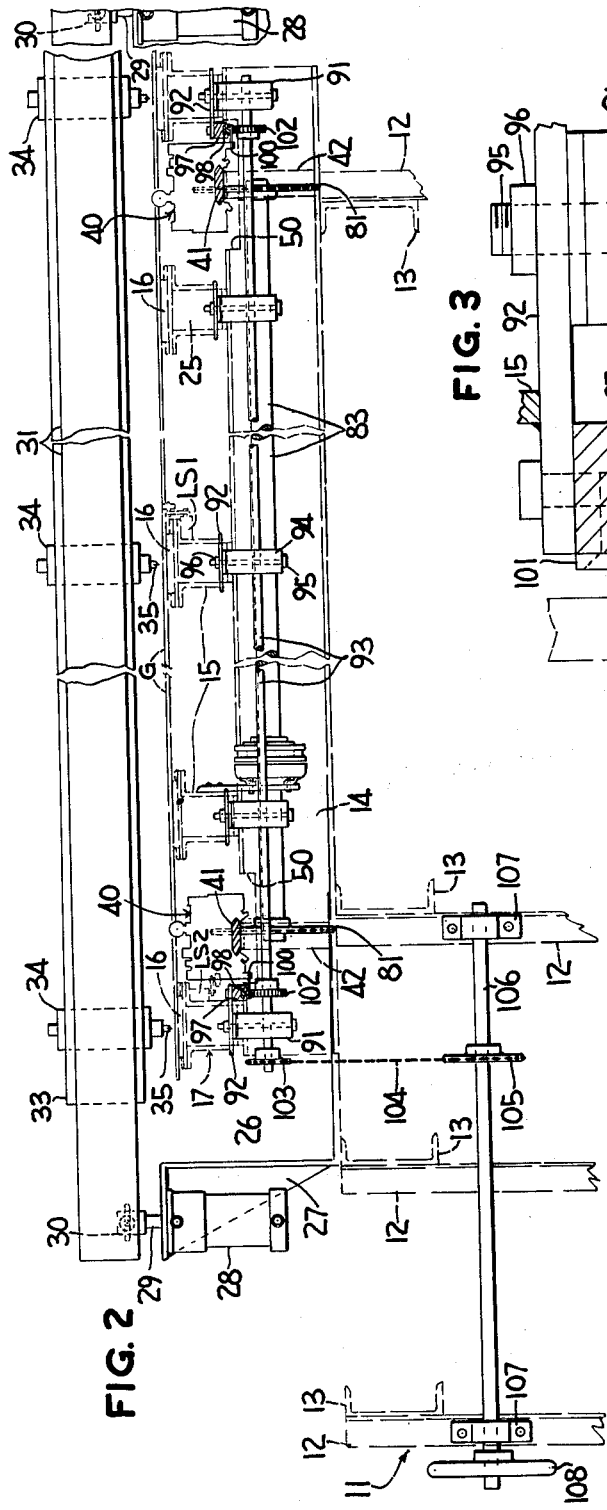
INVENTOR.
EDWARD D. INGOLD
BY
Oscar L Spencer
ATTORNEY July 14, 1964

E. D. INGOLD 3,140,629

GLASS CUTTING APPARATUS

Filed Feb. 21, 1961

INVENTOR.
EDWARD D. INGOLD

BY Oscar H. Spencer

ATTORNEY

July 14, 1964 E. D. INGOLD 3,140,629
GLASS CUTTING APPARATUS
Filed Feb. 21, 1961 6 Sheets-Sheet 4

INVENTOR.
EDWARD D. INGOLD
BY
Oscar Spencer
ATTORNEY

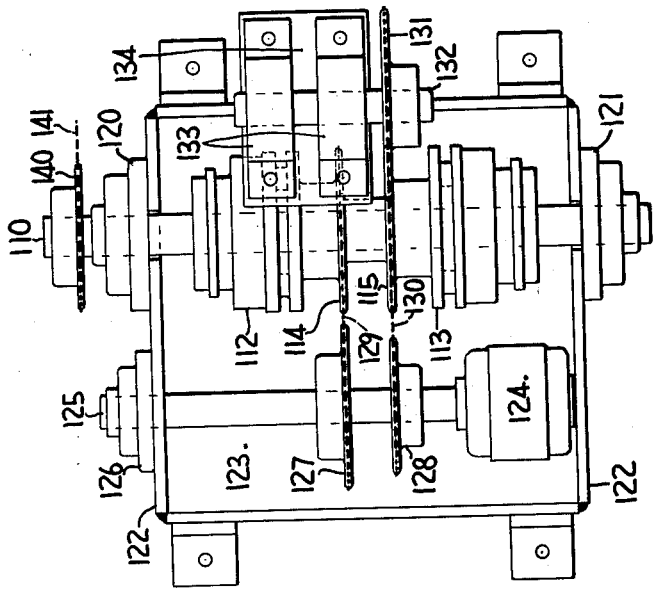
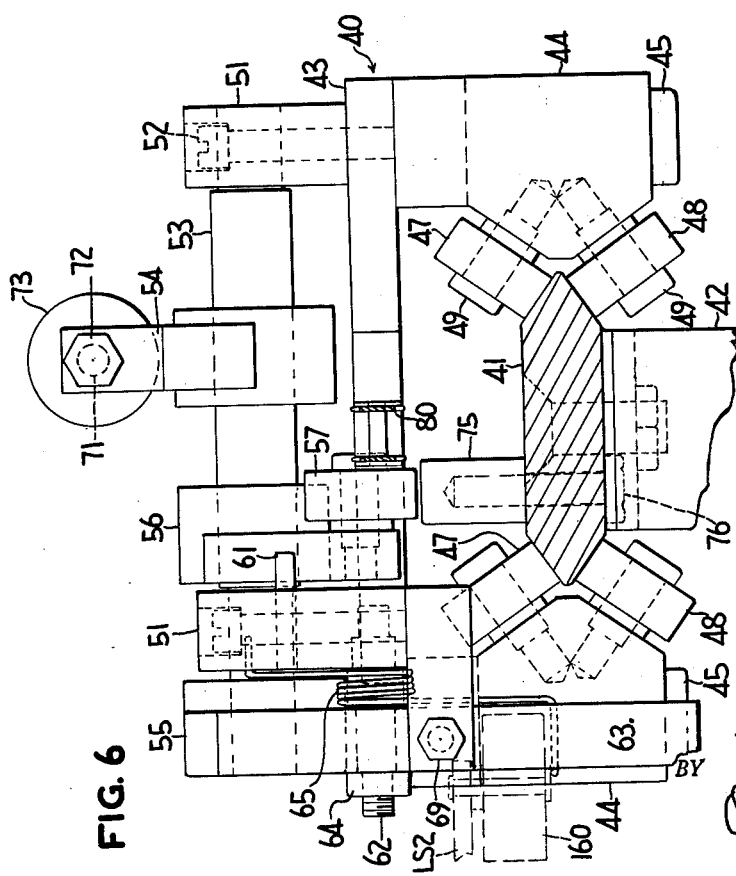

July 14, 1964 E. D. INGOLD 3,140,629
GLASS CUTTING APPARATUS
Filed Feb. 21, 1961 6 Sheets-Sheet 6

INVENTOR.
EDWARD D. INGOLD
BY Oscar L. Spencer
ATTORNEY

United States Patent Office 3,140,629
Patented July 14, 1964

3,140,629
GLASS CUTTING APPARATUS
Edward D. Ingold, Henryetta, Okla., assignor to Pittsburgh Plate Glass Company, Pittsburgh, Pa., a corporation of Pennsylvania
Filed Feb. 21, 1961, Ser. No. 90,854
7 Claims. (Cl. 83—11)

This invention relates to a glass cutting apparatus and more specifically relates to an apparatus for cutting or merely scoring a glass sheet along one or more lines that are normal to an edge of the sheet.

In the apparatus of the present invention a glass sheet is moved in a horizontal path by a conveyor. The moving sheet is passed under one or more glass-scoring tools, such as cutter wheels which can be mounted on a bridge supported above the path of travel of the sheet. When more than one scoring tool is used, parallel score lines are produced on the moving glass sheet. The apparatus further includes a pair of sheet-stopping means spaced from each other in a vertical plane normal to the travel of the glass sheet provided by the conveyor. These sheet-stopping means shift the glass sheet, if necessary, on the conveyor prior to the passage of the glass sheet under the scoring tool or tools. The pair of sheet-stopping means shift the glass sheet, when necessary, to insure that the leading edge of the moving glass sheet is normal to the horizontal path of travel of the glass sheet.

It is an object of the present invention to provide an apparatus for providing at least one score line on a moving horizontal glass sheet so that the score line is normal to the leading edge of the glass sheet regardless of the initial angular disposition of the leading edge of the moving sheet with respect to the direction of horizontal path of travel.

It is a further object of this invention to provide an apparatus for the shifting automatically of the moving horizontal glass sheet, when necessary, so that the leading edge of the glass sheet is normal to the horizontal path of travel of the glass sheet before the sheet passes under glass-scoring tool or tools and for maintaining this relationship between the leading edge and the path of travel while the sheet passes entirely under the scoring tool or tools at the scoring station and until the trailing edge of the sheet is beyond the scoring zone.

These and other objects of the present invention will be apparent to one skilled in the art from the description which follows of the preferred embodiment of the apparatus taken along with the drawings in which similar parts are generally designated by the same numeral and in which:

FIG. 2 is a fragmentary cross section taken along line 2—2 of FIG. 1;

FIG. 3 is a fragmentary enlarged cross section taken along line 3—3 of FIG. 1;

FIG. 6 is a cross section of the apparatus shown along the line 6—6 of FIG. 4;

FIG. 7 is a fragmentary plan as viewed along the line 7—7 of FIG. 1;

Figure 1:
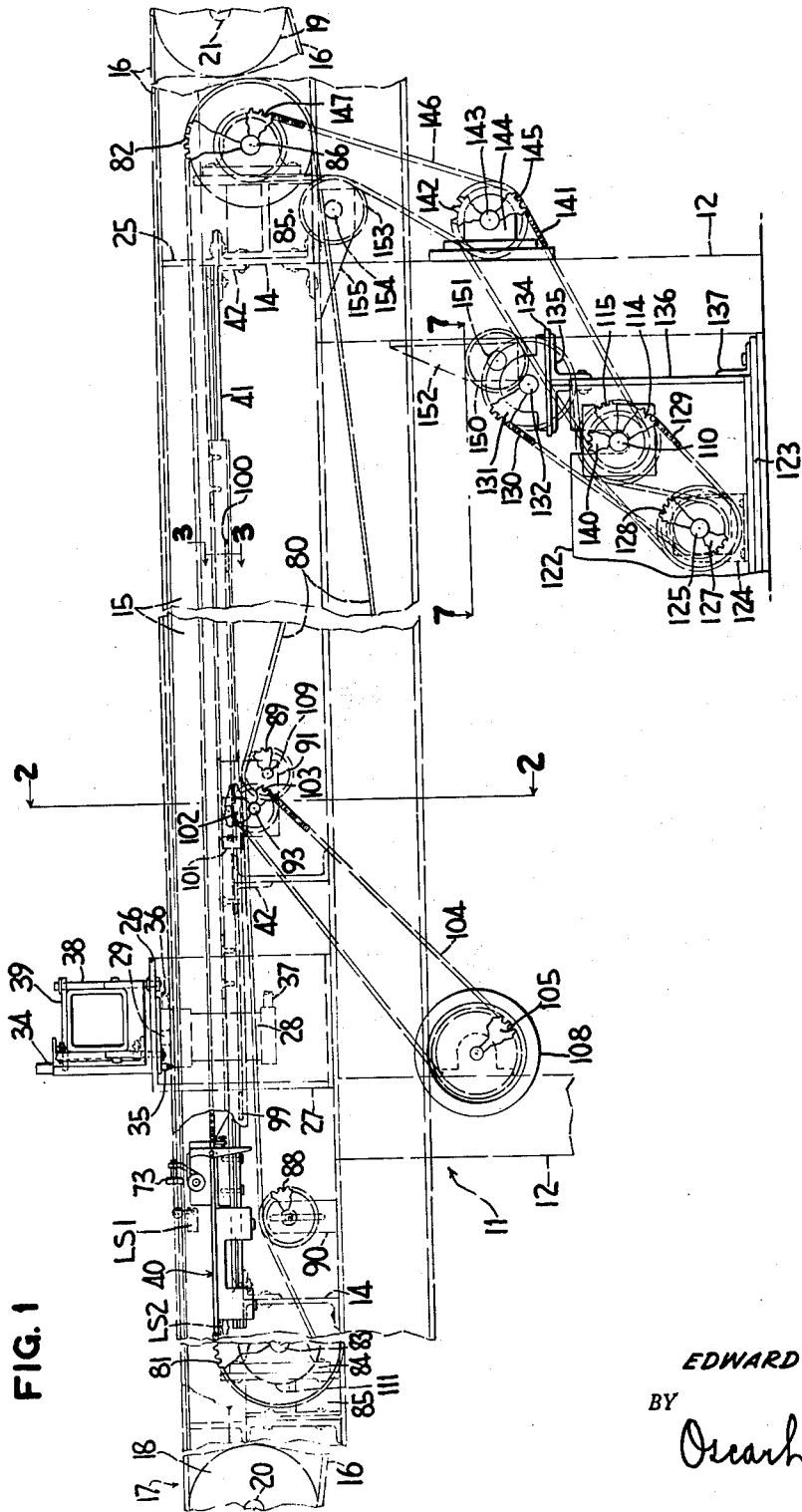
FIG. 1 is an elevation, partly broken away, of the apparatus.

The apparatus of the present invention comprises a supporting structure, conveyor means to move a horizontal glass sheet in a horizontal path of travel, a glass-scoring tool mounted on the supporting structure to score the sheet along a line parallel to the direction of travel at a scoring station during travel of the sheet provided by the conveyor means, and a pair of sheet-stopping means which are spaced from each other in a vertical plane normal to the horizontal path of travel of the glass sheet. Each of the sheet-stopping means is movable from a first position, in which the sheet-stopping means is in the path of travel of the moving sheet, and a second position, in which the sheet-stopping means is out of this path of travel of the sheet.

The apparatus further includes actuated power means to move the pair of sheet-stopping means in a direction which is parallel to the path of travel of the moving sheet provided by the conveyor means. This movement is between a first station and a second station which are on opposite sides of the scoring station, i.e., the scoring station is between the first and second stations of the sheet-stopping means. The apparatus has means to move the pair of sheet-stopping means so that they are at the first position when the pair of sheet-stopping means is at the first station and means to maintain the pair at the first position during movement of the pair from the first station to the second station. The apparatus also includes means to move the pair of sheet-stopping means to the second position when the pair is at the second station.

Sheet-sensing means is included in the apparatus and is mounted on the supporting structure to be responsive to arrival of the moving sheet on the conveyor means so that when the leading edge of the moving sheet is at a position where the leading edge of the moving sheet is at least as far away (in that upstream direction) from the scoring station as the first station of the sheet-stopping means is located. The sheet-sensing means actuates the power means to move the pair of sheet-stopping means from the first station to the second station and means responsive to the moving sheet on the conveyor means actuates the power means to move the pair of sheet-stopping means from the second station to the first station.

The conveyor means and the power means to move the pair of sheet-stopping means are constructed so that the conveyor means when not prevented from doing so by the sheet-stopping means can move the sheet in the path of travel of the sheet at a linear velocity at least slightly greater than the linear velocity of the pair of sheet-stopping means which is provided by power means to move the pair from the first station to the second station. With this arrangement, the velocity of movement of the sheet afforded by the conveyor means will be limited by the velocity of movement of the pair of sheet-stopping means when the moving sheet has its leading edge moving from the first station of the pair of sheet-stopping means to the second station of the pair. This maintains the leading edge of the moving sheet against both of the sheet-stopping means during this travel of the pair of sheet-stopping means so that the leading edge of the sheet is normal to the path of travel of the moving sheet during this travel of the pair of sheet-stopping means from the first station to the second station.

The disposition of the leading edge of the sheet is provided in the first instance, if necessary, when the moving sheet on the conveyor is stopped by the pair of sheet-stopping means at their first position. This occurs automatically because of the construction of the apparatus. If the leading straight edge of the moving sheet approaching the pair of sheet-stopping means at their first position is normal to the path of travel of the moving sheet afforded by the conveyor means, separate portions of the leading edge of the moving sheet will abut the two spaced sheet-stopping means at the same time. This position of the leading edge will be maintained during movement of the pair of sheet-stopping means from their first position to their second position because the greater speed afforded by the conveyor means will maintain these two portions of the leading edge of the sheet in abutment with the pair of sheet-stopping means during this movement of the latter from their first position to their second position.

Because of the construction of the apparatus, a glass sheet having its leading edge angularly disposed other than normal to the path of movement of the sheet provided by the conveyor will be moved by the conveyor until one portion of the leading edge abuts one of the sheet-stopping means. At this time another portion of the leading edge will be spaced from the other sheet-stopping means. This is because the leading edge of the moving sheet is angularly disposed relative to a vertical plane normal to the path of travel of the sheet. The conveyor continues to provide a forward moving force to the glass sheet so that the sheet is shifted until the other portion of leading edge abuts the other sheet-stopping means. When this occurs, the leading edge of the glass sheet is normal to the path of travel of the sheet afforded by the conveyor.

The apparatus of the preferred embodiment as seen in FIG. 1 has a supporting structure generally indicated at 11 including sets of uprights 12 and pairs of horizontal channel irons 13 mounted on uprights 12. The supporting structure 11 includes transverse channel irons 14 which are mounted on horizontal channel irons 13 and which support a number of table sections 15. Belts 16 of a conveyor generally indicated at 17 are supported on their top run by table sections 15. The conveyor 17 has a pulley 18 and a pulley 19 for each belt 16. The pulleys 18 are fixed on a tail shaft 20 which is rotatably mounted on the supporting structure 11 by bearings (not shown). The pulleys 19 are fixed on a head shaft 21 which is rotatably mounted on supporting structure 11 by bearings (not shown) and which is driven through conventional chains and sprockets (not shown) by a motor (not shown).

As seen in FIG. 2, each of table sections 15 includes a pair of elongated angle irons on which is mounted an elongated plate and on the latter at its longitudinal margins are mounted longitudinal bars so that the longitudinal plate and the two bars support and guide, respectively, the belt 16 at its top run on each table section 15. Brackets 25 are welded to the two angle irons of each table section 15 and are bolted on the top of channel irons 14. The bottom run of each belt 16 is about idler pulleys (not shown) mounted on supporting structure 11.

A pair of brackets 26, each having a gusset 27, is mounted on opposite sides of conveyor 17, as seen in FIGS. 1 and 2. An air cylinder 28 is mounted on each bracket 26 and its piston rod 29 extends upwardly through bracket 26. The end of rod 29 is threaded into a U-shaped bracket 30. A square tube 31 extends transversely of the apparatus above conveyor 17 and is bolted near its ends to brackets 30. Thus, tube 31 is supported by and is raised and lowered by air cylinders 28.

Glass sheets G are moved by conveyor 17 from left to right (as viewed in FIG. 1). Thus, FIG. 2 is a view facing upstream. A plate 33 is mounted on the upstream vertical face of tube 31. Cutter assemblies generally indicated at 34 are supported by plate 33. The cutter assemblies 34 may be any one of numerous types of construction which are well-known in the art. In the construction shown in FIGS. 1 and 2, the cutter assemblies 34 can be moved transversely of the path of travel of glass sheet G and then fixed to position cutter wheel 35 of each cutter assembly 34 at different positions to provide different possibilities of score lines in sheet G parallel to the direction of travel of sheet G under cutter assemblies 34. These score lines will be parallel to each other, but the distances between score lines obviously will be dependent upon the locations of the various cutter wheels 35.

In this preferred embodiment of the apparatus, cutter wheels 35 are above sheet G when piston rods 29 are on their extended positions. Each of air cylinders 28 is connected by a hose 36 and a hose 37 to a solenoid-operated, spring-biased, 4-way valve (not shown) which is connected to a pressurized air source (not shown). The 4-way valve for one of cylinders 28 has a solenoid SV1. The valve for the second air cylinder 28 has a solenoid SV2. When solenoids SV1 and SV2 (shown in FIG. 8) are deenergized, the spring for each of these valves has the spool of the valve in a first position so that the valve communicates the pressurized air source with a hose 37 and hose 36 is in communication with the exhaust port of the valve so that the bottom chamber of air cylinder 28 is in communication with the pressurized air source and the top chamber of air cylinder 28 is in communication with the atmosphere. As a result, piston rod 29 is in the extended position.

When solenoids SV1 and SV2 are energized, the spools of the two valves move to a second position for the operation or air cylinders 28 to retract piston rods 29, thereby lowering cutter assemblies 34 to a position in which cutter wheels 35 are in scoring position to provide score lines on glass sheet G as it is moving underneath cutter assemblies 34. When the spools of the two 4-way valves are at the second position, as a result of the enerization of solenoids SV1 and SV2, hoses 36 are in communication with the pressurized air source and hoses 37 are in communication with atmosphere through the valves.

A pair of vertical spaced rods 38, threaded at each end, is mounted on each bracket 26. Stop members 39 are supported on tube 31. The upper ends of rods 38 extend through members 39 and nuts on rods 38 limit the upper travel of tube 31 provided by air cylinders 28.

As seen in FIGS. 1, 2 and 4 through 6, the apparatus of the preferred embodiment has a pair of carriages generally indicated at 40 which are mounted on supporting structure 11. The carriages 40 move from left to right and return (as viewed in FIG. 1). This direction of movement of carriages 40 is parallel to the direction of travel of sheet G provided by conveyor 17. The movement of each of carriages 40 is between a first position, which is the position of carriages 40 shown in FIG. 1, and a second position, which is just to the left of the line 3—3 shown in FIG. 1 as the place at which the cross section is taken for the view of FIG. 3. As pointed out later, the second position for carriages 40 is adjustable in the preferred embodiment.

Each of carriages 40 is supported by and guided in its travel by a guide track or rail 41 bolted on brackets 42 which are mounted on channel irons 14. Each of carriages 40 includes a plate 43 which supports at its longitudinal margins a pair of wheel supports 44. For this support of each wheel support 44 to the undersurface of plate 43 a pair of bolts 45 extend upwardly through wheel support 44 and through plate 43 and nuts 46 on bolts 45 rest on the top surface of plate 43. Each wheel support 44 supports near its ends a pair of wheels 47 and a pair of wheels 48. The wheels 47 and 48 rotatably mounted at each end by stud shafts 49 of supports 44 are offset (in the longitudinal direction of plate 43) with respect to each other and their axes of rotation are angularly disposed. Each of guide tracks 41 is beveled at its upper and lower longitunal margins, as seen in FIG. 6. The four wheels 47 of each carriage 40 ride along the upper beveled surface of guide track 41, whereas the four wheels 48 of each carriage 40 ride along the downwardly facing beveled longitudinal surfaces of track 41. This arrangement prevents lateral and vertical displacement of each carriage 40 with respect to its associated track 41 during its movement on the associated track 41.

As seen in FIG. 2, the guide tracks 41 are at approximately the same elevation as the top of channel irons 14. The wheels 47 and 48 and associated stud shafts 49 along with the lower parts of wheel supports 44 and bolts 45 are below the top of channel irons 14. To provide clearance for the movement of carriages 40, channel irons 14 have notched out portions 50, which are shown clearly in FIG. 2.

On each carriage 40 there is mounted on plate 43 a pair of bearing supports 51 by bolts 52. The bearing supports rotatably mount a shaft 53, which is square in cross section between bearing supports 51. A crank arm 54 is mounted on shaft 53 of each carriage 40. The arm 54 has a square opening through which shaft 53 extends. The arm 54 is fixed on shaft 53 by a set screw (not shown). The shaft 53 at one end extends beyond one of bearing supports 51. On this extension of shaft 53 is keyed a catch arm 55. The shaft 53 between bearing supports 51 also has fixed on it a lifter arm 56. A wheel 57 is rotatably mounted on lifter arm 56 at its free end.

The crank arm or stop arm 54 and lifter arm 56 extend radially from the longitudinal axis of shaft 53, as shown in full lines for these arms, and in this case arm 54 extends generally upwardly and arm 56 is inclined somewhat downwardly. When arm 54 is at its lowered position, as shown in phantom in FIG. 4, lifter arm 56 extends directly downwardly from shaft 53 and this is shown in phantom lines in FIG. 4. Because of these two positions of lifter arm 56 and wheel 57 of each carriage 40, plate 43 is provided with a cut-out portion 58, shown at the right of FIG. 5. Similarly, one corner of each of plates 43, is cut out as shown in the lower right-hand portion of FIG. 5 to provide clearance for arm 55 until shaft 53 has rotated clockwise (as viewed in FIG. 4) to place lifter arm 56 and wheel 57 in the position shown in phantom lines in FIG. 4, at which point arm 55 abuts plate 43.

Figure 4:
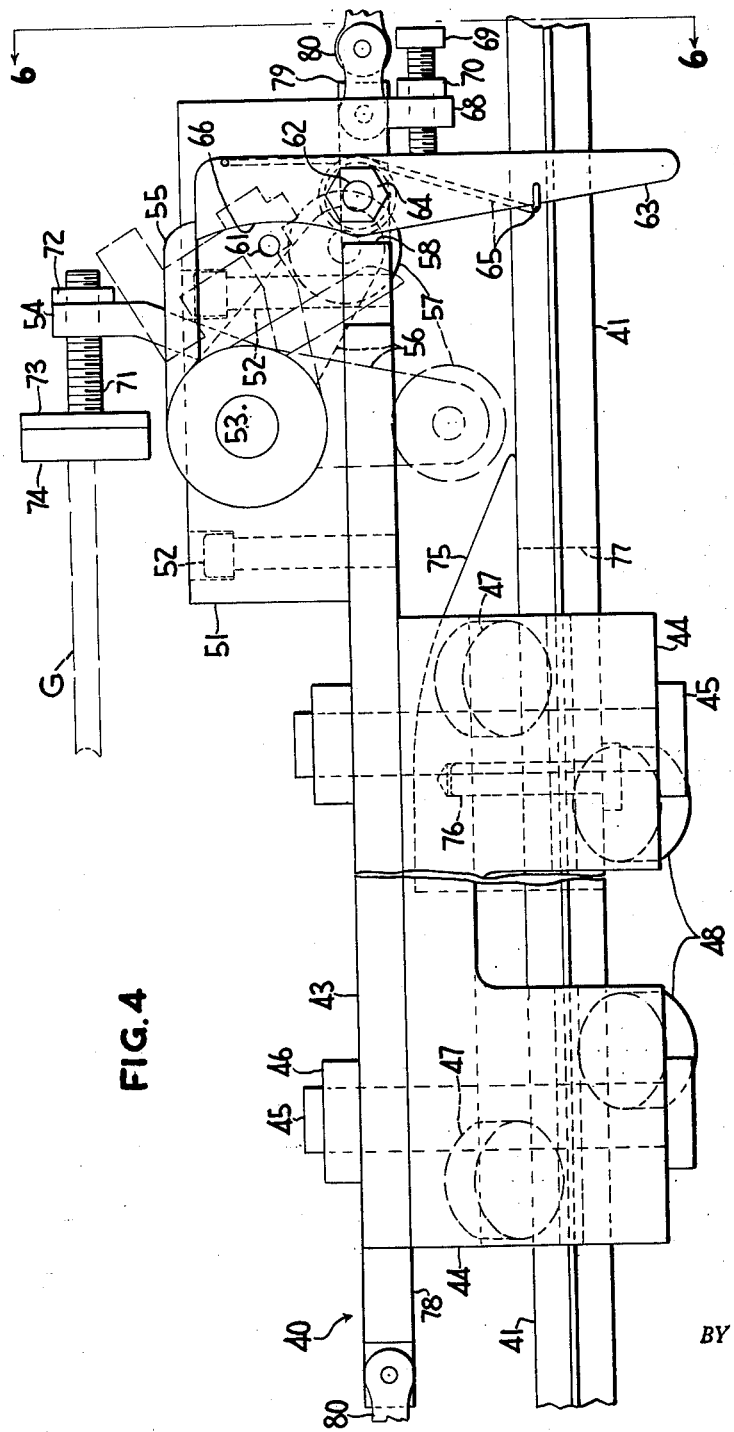
FIG. 4 is a fragmentary enlarged elevation of that part of the apparatus which includes one of the sheet-stopping means shown in full lines in FIG. 1 where the apparatus is partially broken away.
Figure 5:
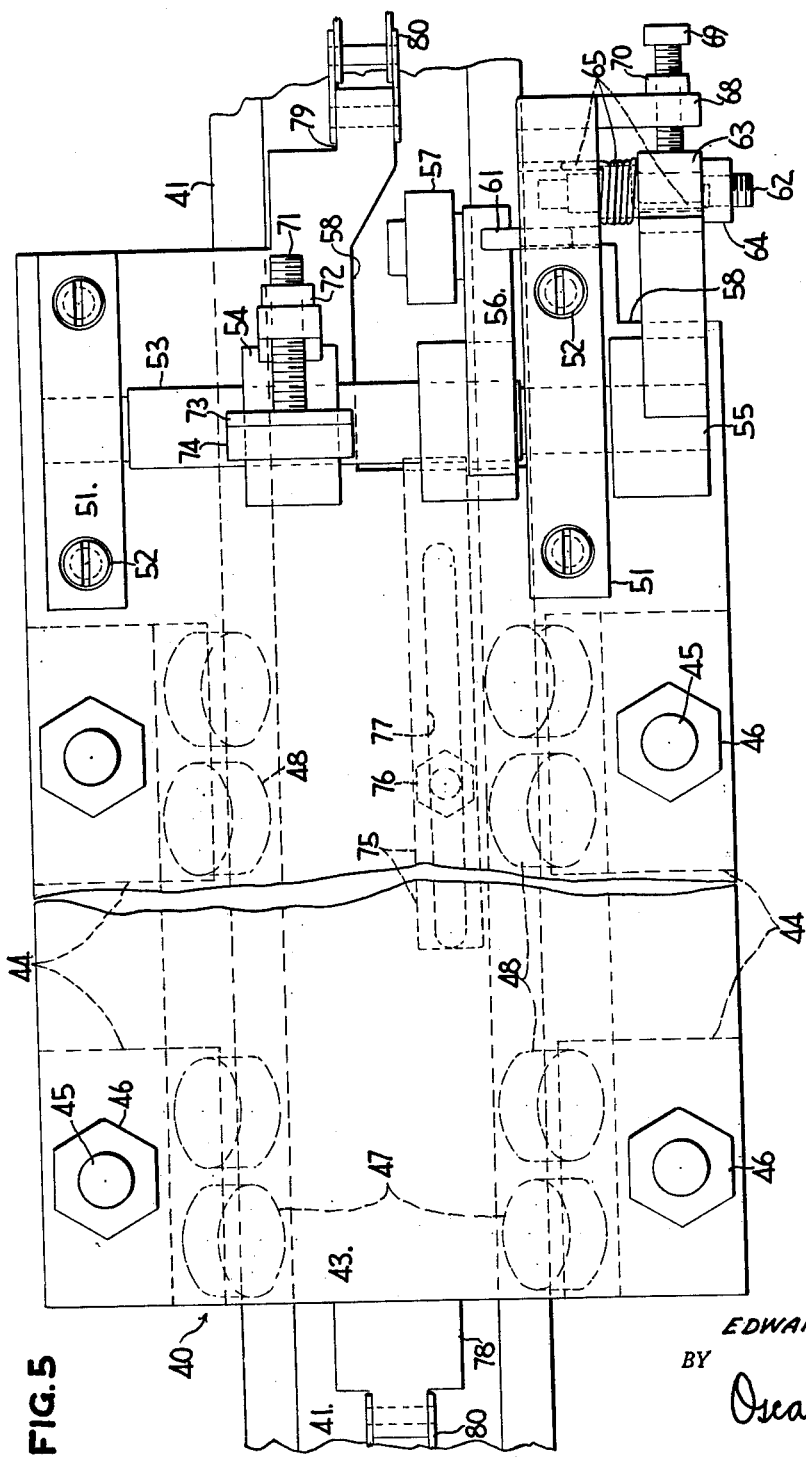
FIG. 5 is a plan of the portion of the apparatus shown in elevation in FIG. 4.

One of bearing supports 51 supports a pin 61 which extends horizontally towards the other bearing support and is in the path of upward movement of lifter arm 56 to limit the upward movement of arm 56 to a maximum position slightly above that shown in its raised position in FIG. 4.

The bearing support 51 that supports pin 61 also supports a tripper pin 62 which is threaded into that bearing support 51. A latch arm 63 is rotatably mounted on pin 62 which is threaded at its outer end to receive a nut 64 that holds arm 63 against a spring 65 that is wound around pin 62. The spring 65 extends, from its portion that is coiled around pin 62, in different tangential directions from the coiled portion and both of the extensions are bent at right angles near their ends. One end of spring 63 extends into a hole in bearing support 51 which supports pin 62 and the other end engages latch arm 63 so that spring 65 urges arm 63 to the position shown in FIG. 4. When latch arm 63 is in this position and arm 55 is in the position shown in FIG. 4, part of the upper portion of the latch arm 63 is under the end portion of arm 55 to maintain arm 55 in that position.

The latch arm 63 has a cylindrical cam surface 66 and the center of curvature of surface 66 is about directly below the axis of rotation of shaft 53 when latch arm 63 is at the position shown in FIG. 4. The arm 55 has a convexly curved upper surface at its free end so that this curved surface of arm 55 slides against the cylindrical surface 66 of latch arm 63 during the upward movement of arm 55 when shaft 53 is rotated counterclockwise (viewed in FIG. 4) with concomitant pivotal movement of arm 63 in a clockwise direction about the longitudinal axis of pin 62 until arm 55 is completely above arm 63. When the latter event occurs, spring 65 moves arm 63 in a counterclockwise direction to place the top portion of arm 63 under the end portion of arm 55 which is the position shown in FIG. 4.

For each carriage 40, bearing support 51 that supports pin 62 has at the same end a downwardly extending flange 68 with a horizontal threaded aperture through which extends a bolt 69 that is fixed in position by a nut 70 and the end of bolt 69 serves as an adjustable stop for the pivotal movement of latch arm 63, i.e., serves to limit the counterclockwise pivotal movement (viewed in FIG. 4) of arm 63 that is provided by spring 65.

The arm 54 has a threaded aperture through which extends a bolt 71 that is adjustably fixed in position by a nut 72. The head 73 of bolt 71 is circular and a disc 74 of rubber or other resilient material is adhered on head 73. The elevation of rubber disc 74 and head 73 is such that when arm 54 is in the raised position, each disc 74 and head 73 is in the path of travel of glass sheet G on belts 16 because carriages 40 are between table sections 15 and sheet G is sufficiently wide to move above carriages 40. The movement of arms 54 of carriages 40 by the rotation of shaft 53 when arms 63 move to unlatch arms 55 is such that rubber discs 74 and heads 73 of bolts 71 are moved to a lowered position that is completely out of path of travel of glass sheet G on belts 16.

When arms 63 are pivoted in a clockwise direction (as viewed in FIG. 4) by the tripping of arms 63, as described later, shafts 53 of carriages 40 move in the same clockwise direction. This latter rotation occurs, because arms 54 and arms 56 and associated parts are constructed, so that the center of gravity of all of the parts mounted on shaft 53 taken as a whole is not in the vertical plane passing through the longitudinal axis of shaft 53, but to the right (as viewed in FIG. 4) of that plane, when arms 54 are in the raised position, such as shown in FIG. 4. As a result, when arms 63 are moved to unlatch arms 55, there is the clockwise rotary movement of arms 54 and arms 56 about shafts 53 until arms 54 abut the notched portions 58 of plates 43.

For each carriage 40, arm 54, bolt 71 with its head 73, and resilient disc 74 may be considered as a sheet-stopping means if and when arm 54 is in the raised position shown on FIG. 4. When arm 54 is in the second or lowered position, wheel 57 is in the position shown in phantom lines in FIG. 4. This occurs at the end of the movement of carriages 40 from left to right to their extreme right-hand position where arms 63 are tripped to unlatch arms 55. This unlatching is described later. This lowered position of arms 56 and wheels 57 continues until after carriages 40 have moved from right to left (as viewed in FIG. 1). When carriages 40 approach their left-hand extreme position (as viewed in FIGS. 1 and 4), wheels 57 ride up on cam plates 75, which are mounted on guide tracks 41 and fixed in position by bolts 76 which extend through a slot 77 in each cam track 71. The slots 77 are present to permit some adjustment in positioning of cam plates 75 in the direction of the longitudinal axis of guide tracks 41.

The plate 43 of each carriage 40 has extensions 78 and 79. The two ends of a chain 80 are connected to extensions 78 and 79 of plate 43 of each carriage 40.

Each of chains 80 extends around a sprocket 81 and a sprocket 82. The sprockets 81 are keyed on a shaft 83 which is rotatably mounted at its ends by pillow blocks 84 which are mounted on supports 85 that are secured to channel iron 14. Similarly, sprockets 82 are keyed on a shaft 86 which is rotatably mounted by pillow blocks 84 mounted on supports 85 that are supported by another channel iron 14. The bottom run of chains 80 engages idler sprockets, including idler sprockets 88 and idler sprockets 89 which are rotatably mounted on brackets 90 and brackets 91 by bearings (not shown). The brackets 90 are mounted on channel irons 13, whereas the brackets 91 are mounted on table sections 15, as shown in FIG. 2.

The brackets 91 that rotatably mount idler sprockets 89 by bearings (not shown) are supported by plates 92 which are welded to the bottom of table sections 15. The brackets 91 also support by bearings (not shown) a shaft 93 near its ends. The shaft 93 is supported at intermediate positions by bearings (not shown) mounted on brackets 94 which are similarly supported by plates 92 mounted on the other table sections 15. The brackets 94 are supported by plates 92 by means of bolts 95 and nuts 96. The brackets 91 are similarly supported. The plates 92 are welded to table sections 15. These plates 92 are in transverse alignment.

Other plates 92 are welded at longitudinally spaced positions to those table sections 15 which are used to support brackets 91 to provide two sets of plates 92 to support guide bars 97 which support racks 98, as seen more clearly in FIG. 3, which is an enlarged view of the right-hand portion of FIG. 2.

Each rack 98 has its left-hand end (as viewed in FIG. 1) provided with a horizontal flange 99 and its other end provided with a horizontal flange 100 which extends further laterally from rack 98 than does flange 99. A plate 101 is mounted on each guide 97 approximately at the location of bracket 91. The plate 101 is hit by either flange 99 or flange 100 of rack 98 during the movement of rack 98 to limit the amount of travel of the rack. Each rack 98 meshes with a gear 102 which is keyed on shaft 93. A sprocket 103 is keyed on one end of shaft 93 and is engaged by a chain 104 which also engages a sprocket 105 keyed on a shaft 106 which is rotatably mounted by bearings 107 mounted on two of uprights 12. A hand wheel 108 is keyed on one end of shaft 106 so that the manual rotation of wheel 108 results in the rotation of shaft 93 to rotate gears 102 for the movement of racks 98 which are being supported by guide bars 97. This means flanges 100 can be moved from left to right and vice versa (as viewed in FIG. 1) to adjustably locate the position or transverse vertical plane at which latch arms 63 will be rotated in a counterclockwise direction (as viewed in FIG 1) to unlatch arms 55 as carriages 40 are moving from left to right. This unlatching movement of arms 63 occurs because flanges 100 are in the path of travel of arms 63. Thus flanges 100 are tripping plates for latch arms 63, i.e., means at the second position of carriages 40 to move arms 54 from the raised position to a lowered position.

The idler sprockets 89 are keyed on shafts 109 which are journaled in support brackets 91.

An electric brake 111 is mounted on shaft 83 so that when the coil EB1 (shown in FIG. 9) of brake 11 is energized, the rotation of shaft 83 is stopped.

As seen in FIG. 7, the apparatus includes a shaft 110 on which an electric clutch 112 and an electric clutch 113 are mounted. Sprockets 114 and 115 are journaled on shaft 110 for free rotation. The sprockets 114 and 115 are secured to the driving parts of electric clutches 112 and 113, respectively, in a conventional manner. The driven parts of electric clutches 112 and 113 are keyed on shaft 110, but when the coils EC1 and EC2 of electric clutches 112 and 113, respectively (shown in FIG. 9), are energized, the driven parts of electric clutches 112 and 113 engage the driving parts of these clutches so that sprockets 114 and 115, respectively, rotate the driving parts of these clutches. Of course, only one of coils EC1 and EC2 is energized at any one time.

As seen below, when electric clutch 112 is operating, shaft 110 rotates in one direction, whereas when electric clutch 113 is operating, shaft 110 rotates in the opposite direction.

As seen in FIGS. 1 and 7, shaft 110 is supported for rotation by bearings 120 and 121 mounted on plates 122 which are mounted on support plate 123 of supporting structure 11. A motor 124, which is operated continuously by electrical power from a source (not shown), is mounted on plate 123. The shaft 125 of motor 124 is supported at its end by a bearing 126 mounted on one of plates 122. Sprockets 127 and 128 are keyed on shaft 125 and are engaged by chains 129 and 130, respectively. The chain 129 engages sprocket 114 and chain 130 engages sprocket 115 in the manner shown in FIG. 1. The sprocket 130 also engages a sprocket 131 keyed on a shaft 132 which is supported for free rotation by a pair of bearings 133 mounted on a support plate 134 which is mounted on angle irons 135 mounted on a vertical plate 136 mounted on plate 123 by angle irons 137.

Because chain 130 goes around sprocket 131 and then around sprocket 115 only at its top left-hand portion (viewed in FIG. 1), the direction of rotation of sprocket 115 is counterclockwise (as viewed in FIG. 1), whereas sprocket 114 rotates clockwise with the clockwise rotation of sprockets 127 and 128 (as viewed in FIG. 1).

A sprocket 140 is keyed on one end of shaft 110 and is engaged by a chain 141 which engages a sprocket 142 keyed on a shaft 143 which is rotatably mounted on bearings 144 mounted on a pair of uprights 112. A sprocket 145 is keyed on shaft 143 and sprocket 145 is engaged by a chain 146 which engages a sprocket 147 keyed on shaft 86. In view of this construction, motor 124 can move carriages 40 forward (from left to right in FIG. 1) or in reverse by operating electric clutches 112 and 113, respectively.

The chain 141 also engages an idler sprocket 150 keyed on a shaft 151 journaled on a bracket 152 mounted on one of uprights 12. An idler sprocket 153 is similarly keyed on a shaft 154 which is journaled on a bracket 155 mounted on one of channel irons 14. The idler sprocket 153 engages chain 146.

A limit switch LS1 is mounted on one of intermediate table sections 15 at the position shown in FIG. 1. The switch LS1 is also shown in FIG. 2. The switch LS1 is mounted so that it is tripped by glass sheet G just before sheet G at its leading edge abuts discs 74 on carriages 40. The contact of switch LS1 is of the normally open type and is closed by sheet G until the trailing edge of sheet G passes beyond switch LS1.

The switch LS1 is a sheet-sensing means for the arrival of the leading edge of sheet G at or slightly ahead (in the present embodiment) of the scoring station at which scoring tools, i.e., cutter wheels 35 are located. The switch LS1 also "senses" in cooperation with a timer, described below, the passage of the trailing edge of sheet G beyond the scoring station.

The apparatus also includes a limit switch LS2 which has a normally closed contact LS2–1 and a normally open contact LS2–2. The switch LS2 is located so that its roller 160 (FIG. 6) is moved by one of wheel supports 44 of one of carriages 40 to move the arm of switch LS2 for the opening of contact LS2–1 and the closing of contact LS2–2.

Figure 8:
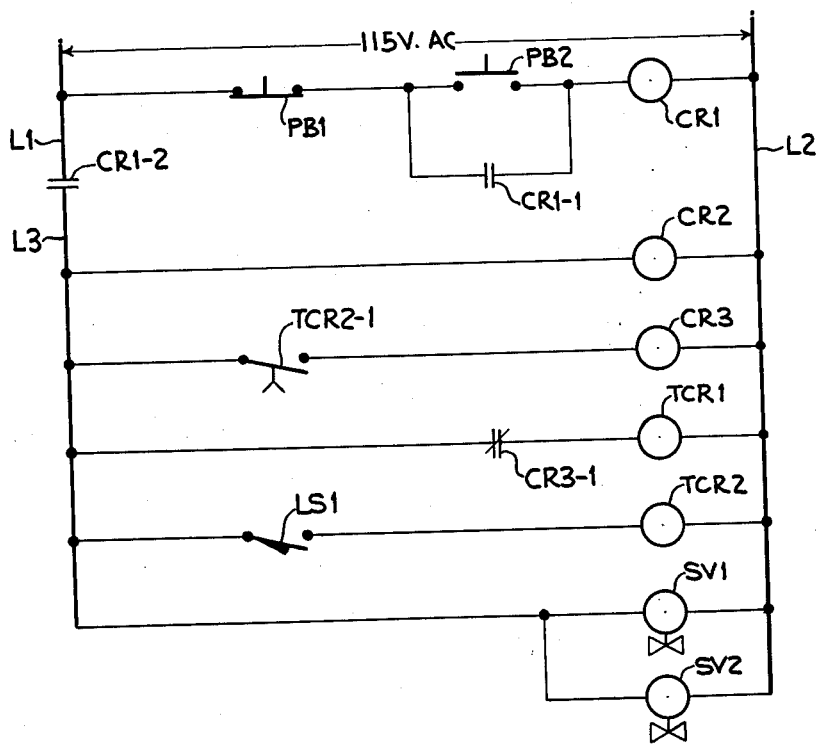
FIG. 8 is a schematic drawing of part of the electrical circuitry used in the apparatus.

Referring to FIG. 8, electrical lines L1 and L2 are connected to a 115-volt A.C. source. A first circuit is connected to lines L1 and L2 and includes a coil CR1 of a relay in series with a normally closed push-button switch PB1 and a normally open push-button switch PB2. The relay having coil CR1 has normally open contacts CR1–1 and CR1–2. The contact CR1–1 is in parallel with switch PB2 and in series with switch PB1 and coil CR1. The contact CR1–1 provides a holding circuit for coil CR1 in the following manner. An operator momentarily closes switch PB2 to energize coil CR1, thereby closing contact CR1–1 and CR1–2. When switch PB2 is opened, contact CR1–1 maintains coil CR1 energized until an operator opens switch PB1. The other circuits of FIG. 8 are connected by line L3 to line L1 through contact CR1-2 which is closed when coil CR1 is energized.

One of these other circuits includes a coil CR2 which is connected to lines L3 and L2. Thus, coil CR2 of a relay, having a normally open contact CR2-1 (FIG. 9), is normally energized because the normal operation includes the energization of line L3 by the energization of coil CR1 to close contact CR1-2.

Figure 9:
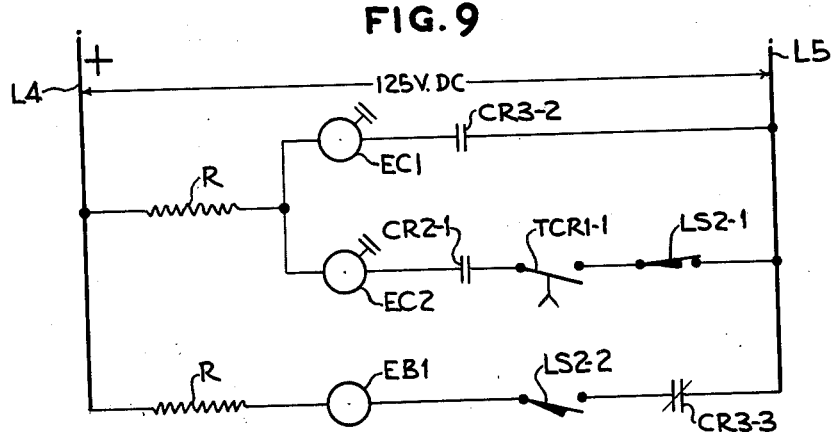
FIG. 9 is a schematic drawing of another part of the electrical circuitry used in the apparatus.

Another circuit connected to lines L3 and L2 includes a coil CR3 of a relay having a normally closed contact CR3-1 (FIG. 8), a normally open contact CR3-2 and a normally closed contact CR3-3 (FIG. 9). In series with coil CR3 is a normally open contact, of the time-closing type, which is in a relay mentioned below.

Another circuit connected to lines L3 and L2 includes in series contact CR3-1 and a coil TCR1 of a timer of the on-delay type which has a normally open contact TCR1-1 of the time-closing type (FIG. 9). The coil TCR1 of that timer is normally energized because coil CR3-1 is normally closed. The coil CR3 is energized only when the contact, in series with it, is closed, which does not occur until glass sheet G is maintaining switch LS1 closed. With coil TCR1 normally energized by this circuitry, contact TCR1-1 is closed.

Another circuit connected to lines L3 and L2 includes a coil TCR2 of a timer which is in series with normally open switch LS1. This timer has contact TCR2-1 in series with coil CR3.

The coils SV1 and SV2 referred to earlier are connected to lines L3 and L2 in parallel circuits and these coils are energized so long as coil CR1 is energized to maintain contact CR1-2 closed which is the normal condition of operation, so that piston rods 29 are in their retracted position in order that cutter wheels 35 are in their scoring position.

Referring now to FIG. 9, electrical lines L4 and L5 are connected to a 125-volt D.C. source. A first circuit is connected to lines L4 and L5 and includes a resistance R, the coil EC1 of electric clutch 112, and contact CR3-2. Another circuit connected to lines L4 and L5 includes the resistance R, mentioned above, and coil EC2 of electric clutch 113, contact CR2-1, contact TCR1-1 and contact LS2-1. Except for resistor R, coil EC2 and these contacts of this circuit are in parallel with coil EC1 and contact CR3-2.

Another circuit includes a second resistor R, coil EB1 of electric brake 111, contact LS2-2 and contact CR3-3.

When switch LS1 is closed, with lines L3 and L2 energized, timer coil TCR2 of a timer having contact TCR2-1 is energized, and after the delay, which can be set for this timer, contact TCR2-1 closes to energize coil CR3 for the closing of contact CR3-2 and the opening of contacts CR3-1 and CR3-3. As a result, coil TCR1 is deenergized to open contact TCR1-1 and opens contact CR3-3 to deenergize coil EB1 even if contact LS2-2 is closed at this time. This condition for switch LS2 exists when carriages 40 are at their extreme left-hand position of movement, because at that point switch LS2 is tripped by one of carriages 40. The deenergization of coil EB1 results in the releasing of electric brake 111 so that shaft 83 can be rotated.

Because contact CR3-2 is now closed, coil EC1 of electric clutch 112 is energized so that motor 124 rotates shaft 86 in the clockwise direction (as viewed in FIG. 1) through electric clutch 112, etc. to pull carriages 40 from left to right (as viewed in FIG. 1).

As soon as carriages 40 leave the extreme left-hand position of their travel, switch LS2 is no longer tripped so that contact LS2-1 returns to its normally closed position, but this does not result in the energization of coil EC2 because contact TCR1-1 is open. Similarly, the movement of carriages 40 forward or to the right results in the opening of contact LS2-2 so that later when contact CR3-3 closes, the coil EB1 will not be energized at that time.

When the trailing edge of sheet G passes beyond LS1, with of course the leading edge still abutting rubber disc 74 on carriages 40, and belts 16 of conveyor 17 providing the moving force for sheet G and maintaining this abutment, switch LS1 opens to deenergize coil TCR2. The contact TCR2-1 opens to deenergize coil CR3 thereby closing contact CR3-1 to energize coil TCR1. At the same time, contact CR3-1 opens to deenergize coil EC1 of electric clutch 112 so that the forward drive, i.e., the drive from left to right, of carriages 40 is stopped.

With contacts LS2-1 and CR2-1 now closed, the energization of coil EC2 awaits the closing of contact TCR1-1. After the energization of coil TCR1, the contact TCR1-1 after its delay closes. This amount of delay is chosen so that the trailing edge of sheet G has passed downstream beyond the cutter wheels 35 so that the scoring has been completed.

When contact TCR1-1 closes, coil EC2 is energized to operate electric clutch 113 so that carriages 40 are moved in the reverse direction, i.e., from right to left (as viewed in FIG. 1). This movement of carriages 40 continues until one of carriages 40 trips switch LS2 to open contact LS2-1. At the same time, contact LS2-2 is closed so that coil EC2 is deenergized and coil EB1 is energized. The latter occurs because contact CR3-3 closed when, after delay, coil CR3 was deenergized following the passage of the trailing edge of sheet G beyond switch LS1. The coil EC1 does not become energized at this time because contact CR3-2 is open and remains open until switch LS1 is closed by the leading edge of the next sheet G to energize coil TCR2 for the closing, after its delay, of contact TCR2-1. The energization of coil EB1, of course, results in the application of electric brake 111 to stop the rotation of shaft 83 and thereby stop the movement of carriages 40.

*Operation*

For the purpose of describing the operation, it is assumed that coil CR1 is energized so that line L3 is energized along with line L2 and thus coil CR2 is energized. It is assumed that motor 124 is operating continuously and conveyor 17 is operating with belts 16 in the top run moving from left to right (as viewed in FIG. 1). It is further assumed that at the start of the operation carriages 40 are at their extreme left-hand position of movement, with cam plates 75 having moved wheels 57 upwardly to provide catch arms 55 in the raised position with latch arms 63 underneath the ends of arms 55 so that the pair of sheet-stopping means, including bolts 71 and rubber discs 74, is in the path of travel of sheet G provided by moving belts 16.

A glass sheet G is moved onto or placed on belts 16 of conveyor 17 at the upstream end, i.e., the left-hand end (as viewed in FIG. 1). The sheet G moves from left to right until switch LS1 is tripped. The movement of sheet G provided by conveyor 17 continues until a portion of the leading edge trips one of discs 74.

If both discs 74 are simultaneously abutted by two portions of the leading edge of glass sheet G, the leading edge is already normal to the path of movement being provided to sheet G by conveyor 17. If only one portion of leading edge sheet G abuts one disc 74 and another portion does not at the same time abut the other disc 74, the leading edge is not normal to the path of movement of sheet G provided by conveyor 17. However, belts 16 are continuing a forward force of movement of sheet G so that it pivots about the point of abutment to shift sheet G until another portion of the leading edge abuts the second disc 74. This results in a so-called "squaring" of sheet G with the leading edge of sheet G now being disposed normal to the path of travel of sheet G afforded by conveyor 17 rather than being angularly disposed with regard to the vertical plane normal to this path of travel of sheet G afforded by conveyor 17.

The delay of closing of contact TCR2-1 is chosen so that there is sufficient time after the closing of switch LS1 to provide this shifting of sheet G until the leading edge of sheet G abuts both discs 74, if necessary. After this delay, the contact TCR2–1 closes to energize coil CR3, thereby deenergizing coil EB1 to release electric brake 111 and energizing coil EC1, with the result that electric clutch 112 operates to move carriages 40 forward, i.e., from left to right and sheet G with them at a slightly slower speed than sheet G would be moved by conveyor 17 if discs 74 were not in the path of travel.

The carriages 40 are moved by motor 124 at least until flanges 100 trip arms 63 to move them in a clockwise direction (as viewed in FIG. 4) so that arms 55 can drop down thereby moving down arms 54, bolts 71 and discs 74. When discs 74 and bolts 73 are out of the path of travel of sheet G, the velocity of sheet G returns to that originally afforded by conveyor 17 when the motion of sheet G was unimpeded by discs 74. Shortly after this happens, contact TCR1–1 closes because flanges 100 are located at a position dependent upon the length of glass sheet G to be scored in the direction of its length. The delay in closing TCR1–1 is such that the trailing edge of sheet G has passed cutter wheels 35. Of course, before contact TCR1–1 closes, contact CR3–2 has opened to deenergize coil EC1 to render inoperative clutch 112. The latter occurs when coil TCR1 is energized at the time that coil CR3 is deenergized to initiate the energization of coil TCR1. This occurs after the deenergization of coil TCR2 by the opening of switch LS1 for the opening of contact TCR2–1.

When coil EC2 is energized, motor 124 moves carriages 40 in the reverse direction until switch LS2 is tripped to open contact LS2–1 for the deenergization of coil EC2. Just before switch LS2 is tripped, wheels 57 ride up on cam plates 75 to rotate shafts 53, in the manner indicated above, until arms 55 are above arms 63 whereby the top portions of arms 63 are moved by springs 65 into the latching position. Of course, where this occurs there is no glass sheet G so that when discs 74 are moved up into the path of travel of sheet G, the latter has already passed. At this time, the trailing edge of sheet G has passed the scoring station and the leading edge of a new sheet G has not reached switch LS1.

At the time that switch LS2 is tripped, the contact LS2–2 is closed and since contact CR3–3 has already been closed coil EB1 is energized to operate brake 111. The discs 74 are in the first position and at their first station which is at the first station of carriages 40 so that discs 74 can be abutted by the leading edge of next glass sheet G. Of course, the next cycle of operation is started when the leading edge of the next sheet G trips switch LS1.

Modifications of the electrical circuitry will be apparent to one skilled in the art from the description which has been presented. For example, instead of limit switch LS1 there could be utilized two normally open limit switches which would be located at the transverse vertical plane of discs 74 when carriages 40 are at their home position, i.e., the position shown at the left-hand end of FIG. 1. In this case, the circuitry would be modified so that both limit switches would be required to be tripped by portions of the leading edge of sheet G. The circuitry would require that this tripping of both would initiate the movement of carriages 40. With this construction, one would be sure that both discs 74 are being abutted by portions of the leading edge of sheet G. Such a modification would be apparent to one skilled in the art from the disclosure of the present application.

In another apparent modification, square tube 31 could be moved downwardly by a control circuitry whenever the leading edge of sheet G has just passed cutter wheels 35 and then raised just as the trailing edge of sheet G is about to pass cutter wheels 35. With this construction, wheels 35 would not be required to ride up onto glass sheet or ride off of the glass sheet at its leading and trailing edges. This would avoid damage of the glass sheet. However, various cutter assemblies have been developed that will prevent this even though the cutter wheel is at the scoring position when the glass sheet is not directly underneath it. These modifications lift the cutter wheel up as the leading edge approaches and gently let it down as the trailing edge leaves the cutter wheel.

Various other modifications of the apparatus will be apparent to one skilled in the art from the description of the preferred embodiment presented above and in the drawings. Thus, the invention is not to be limited by this description but only by the claims that follow.

I claim:

1. An apparatus for cutting a moving glass sheet along a line normal to the leading edge of the moving sheet which comprises a supporting structure, conveyor means to move a horizontal glass sheet in a horizontal path of travel, a glass scoring tool mounted on the supporting structure to score the sheet along a line at a scoring station during travel of the sheet provided by said conveyor means, a pair of sheet-stopping means, said sheet-stopping means being spaced from each other in a vertical plane normal to the horizontal path of travel of the sheet and each sheet-stopping means being mounted for movement between a first position in the path of travel of the moving sheet and a second position out of the path of travel of the moving sheet, actuated power means to move said pair of sheet-stopping means parallel to the path of travel of the moving sheet between a first station and a second station, said scoring station being between said first and second stations, means to move said pair of sheet-stopping means to be at the first position when said pair is at the first station, means to maintain said pair at the first position during movement of said pair from the first station to the second station, means to move said pair to the second position at the second station, sheet-sensing means mounted to be responsive to arrival of the moving sheet with its leading edge at a position at least as far away from the scoring station as the first station, said sheet-sensing means actuating said power means to move said sheet-stopping means from the first station to the second station, and means responsive to the moving sheet to actuate said power means to move said pair of sheet-stopping means from the second station to the first station.

2. The apparatus of claim 1 wherein the means to move said pair of sheet-stopping means to the second position at the second station is adjustably mounted to adjustably locate the position of the second station of the pair of sheet-stopping means.

3. The apparatus of claim 1 wherein each of the pair of sheet-stopping means includes a rigid member having a resilient member mounted on it to be abutted by the glass sheet, wherein each sheet-stopping means being mounted for movement between first and second positions by an arm fixedly mounted on a horizontal shaft having an axis of rotation normal to the path of movement of the sheet afforded by said conveyor means, wherein said actuated power means to move said pair of sheet-stopping means includes a pair of carriages rotatably mounting said shafts, chains to move said carriages and motor means to move said chains, and wherein said supporting structure includes guide tracks to support and guide said carriages in the path of travel to move said pair of sheet-stopping means parallel to the path of travel of the moving sheet.

4. The apparatus of claim 3 wherein said means to maintain said pair of sheet-stopping means at the first position during movement of said pair from the first station to the second station includes latching means and wherein said means to move said pair to the second position at the second station includes unlatching means to move said latching means to an unlatching position.

5. The apparatus of claim 4 wherein the sheet-stopping means is constructed and arranged to move by gravity from the first position to the second position when said unlatching means operates to render ineffective said latching means, wherein the apparatus is constructed and arranged to permit said gravitational force to maintain said pair of sheet-stopping means at the second position during the travel of said carriages and said sheet-stopping means from the second station to the first station, wherein said means to move said pair of sheet-stopping means to be at the first position when the said pair is at the first station includes cam means mounted on said supporting structure and a lifting arm fixed on each of said shafts, and wherein said lifting arms rotatably mount wheels to ride up on said cam means for rotation of said shafts to lift said pair to the first position and to move into operative position said latching means.

6. The apparatus of claim 5 wherein said sheet-sensing means includes a limit switch mounted upstream of said scoring station.

7. The apparatus of claim 6 wherein said glass scoring tool is a cutter wheel and said apparatus further includes additional cutter wheels and wherein said supporting structure includes a bridge mounted above said conveyor means and supporting said scoring tools.

References Cited in the file of this patent
UNITED STATES PATENTS

| | | |
|---|---|---|
| 1,764,966 | Mazer | June 17, 1930 |
| 2,265,028 | De Croce | Dec. 2, 1941 |
| 2,334,645 | Plumb | Nov. 16, 1943 |
| 2,515,076 | Birchard | July 11, 1950 |
| 2,556,757 | Guild | June 12, 1951 |
| 2,650,430 | Klages | Sept. 1, 1953 |
| 2,806,553 | Eames | Sept. 17, 1957 |
| 2,932,365 | Hornung | Apr. 12, 1960 |
| 2,943,393 | Insolio | July 5, 1960 |
| 2,948,991 | Walters | Aug. 16, 1960 |